US 6,628,878 B2

(12) United States Patent
Akeda et al.

(10) Patent No.: US 6,628,878 B2
(45) Date of Patent: Sep. 30, 2003

(54) PROTECTION CAP FOR OPTICAL CONNECTOR

(75) Inventors: Nobuyuki Akeda, Shizuoka (JP); Shinya Tanaka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/875,941

(22) Filed: Jun. 8, 2001

(65) Prior Publication Data

US 2002/0013076 A1 Jan. 31, 2002

(30) Foreign Application Priority Data

Jul. 3, 2000 (JP) ........................................ 2000-201367

(51) Int. Cl.[7] ................................................ G02B 6/00
(52) U.S. Cl. ........................................ 385/134; 439/135
(58) Field of Search ................................. 385/134–137, 385/75–81; 439/135, 136, 139, 149, 148

(56) References Cited

U.S. PATENT DOCUMENTS

| 4,640,575 A | | 2/1987 | Dumas |
| 4,767,179 A | * | 8/1988 | Sampson et al. ............. 385/93 |
| 5,202,949 A | | 4/1993 | Hileman et al. |
| 5,305,408 A | * | 4/1994 | Schaffer et al. ............. 385/92 |
| 5,414,790 A | | 5/1995 | Lee et al. |
| 6,113,280 A | * | 9/2000 | Nagaoka et al. .......... 385/92 X |
| 6,335,996 B1 | * | 1/2002 | Yamaguchi ................. 385/134 |

FOREIGN PATENT DOCUMENTS

| EP | 0 928 980 A1 | 7/1999 |
| JP | 9-61677 | 3/1997 |

OTHER PUBLICATIONS

Patent Abstracts of Japan, vol. 2000, No. 02, (Feb. 29, 2000) JP 11 307817 A (Sumitomo Electric Ind, Ltd.) Nov. 5, 1999*abstract.
Patent Abstracts of Japan, vol. 1996, No. 06, (Jun. 28, 1996) JP 08 043682 A (Hirose Electric Co., Ltd; Others: 01), (Feb. 16, 1996)*abstract.

* cited by examiner

Primary Examiner—Lynn Feild
Assistant Examiner—Son V. Nguyen
(74) Attorney, Agent, or Firm—Armstrong, Westerman & Hattori, LLP

(57) ABSTRACT

The protection cap is removably attached to an optical connector or a hybrid connector each having a cable ferrule therein. The cable ferrule has an end face at which an optical core cable is exposed. The protection cap has a locked portion engaged with a lock portion of the optical connector or the hybrid connector and has a projection (23) on an innerwall of the protection cap for protectively covering the end face of the cable ferrule. The protection cap is defined in a box shape, which can be molded by one or more molding dies that can be removed parallel to an engagement direction of the protection cap with the connector.

4 Claims, 3 Drawing Sheets

PROTECTION CAP FOR OPTICAL CONNECTOR

BACKGROUND OF THE INVENTION

1. Field of the Invention

The present invention relates to a protection cap for protecting a ferrule mounted in an optical connector or a hybrid connector having an optical connector portion.

2. Related Art

In various types of vehicles such as an automobile, there are provided an extremely large number of control signals. When each control signal is transmitted through an individual signal path line, a large number of signal path lines are required, so that a wiring harness thereof undesirably becomes heavy. Furthermore, various types of recent electronic instruments require transmitting information having a larger capacity and a higher density, also resulted in a heavy weight wiring harness thereof. Therefore, a recent wiring harness partially includes optical fiber cables (or optical fiber cords), for example, for connection between nodes of the wiring harness.

A system including such a wiring harness requires an optical connector or a hybrid connector each having a ferrule surrounding an optical cable. The ferrule has an end face at which the optical cables are exposed. Note that the hybrid connector integrally has an electrical connection portion and an optical connection portion.

The optical connector or the hybrid connector is directly protected by a protection cap until the use of the connector to protect the ferrule having the end face at which the optical cable is exposed.

Referring to FIG. 5, such a protection cap will be briefly discussed hereinafter. A protection cap 1 is made of a synthetic resin material and is defined in a rectangular box-shape. The protection cap has an entrance opening 2 from which an optical connector (not shown) is inserted. Furthermore, the protection cap has a locked portion 3 engaged with a lock projection of the optical connector.

Note that the protection cap 1 of FIG. 1 can be molded by molding dies which can be removed in a direction parallel to an arrow P (double-headed) after the molding. For an easy removal of the molding dies, the protection cap has an end wall 5 having a cutout edge so that the locked portion 3 has a large opening.

However, thus defined protection cap 1 has the following disadvantage, because the protection cap 1 needs to have the locked portion 3 engaged with the lock projection of the optical connector to prevent an unintentional disengagement of the protection cap from the optical connector. That is, the locked portion 3 has the large opening due to the use of the simplified molding dies. From the large opening, undesirable dust or contaminants may enter into the protection cap. Thus, the protection cap 1 is insufficient for protecting the optical connector.

Therefore, as illustrated in FIG. 6, a protection cap 7 having a minimum opening 6 would be proposed. However, the protection cap 7 requires complicated molding dies, one of which needs to slide in a direction parallel to an arrow Q. This increases a production cost of the protection cap 7, so that the protection cap 7 would be commercially unsuccessful.

SUMMARY OF THE INVENTION

In view of the above-mentioned problem, an object of the invention is to provide a protection cap which can surely protect a ferrule of an optical connector. Furthermore, the protection cap can be produced without an expensive cost.

For achieving the object, a protection cap according to the present invention is removably attached to an optical connector or a hybrid connector each having a cable ferrule therein, the cable ferrule having an end face at which an optical cable core is exposed. The protection cap has a locked portion engaged with a lock portion of the optical connector or the hybrid connector and has a projection on an inner wall of the protection cap for protectively covering the end face of the cable ferrule. The protection cap is of a box shape which can be molded by one or more molding dies that can be removed parallel to an engagement direction of the protection cap with the connector.

The protection cap is defined by the molding dies that can be removed parallel to the engagement direction of the protection cap. Thus, the molding dies are simplified to be advantageous for molding the protection cap. Although the protection cap has the lock portion with a large opening due to the simplified molding dies, the protection cap can surely protect the ferrule by the projection formed on the inner wall of the protection cap.

Preferably, the projection has an annular tapered edge at a tip of the projection.

The tapered edge formed in the projection can intimately contact the ferrule, so that an exposed core of the ferrule is protected from dust.

Preferably, the projection can be inserted into an accommodation chamber of the cable ferrule of the connector until a tip end surface of the connector abuts against the inner wall of the protection cap, when the protection cap receives the connector. Thereby, the protection cap can further surely protect the ferrule by the projection and the inner wall of the protection cap.

DETAILED DESCRIPTION OF PREFERRED EMBODIMENT

Referring to the accompanied drawings, an embodiment of the present invention will be discussed.

Figure 1:
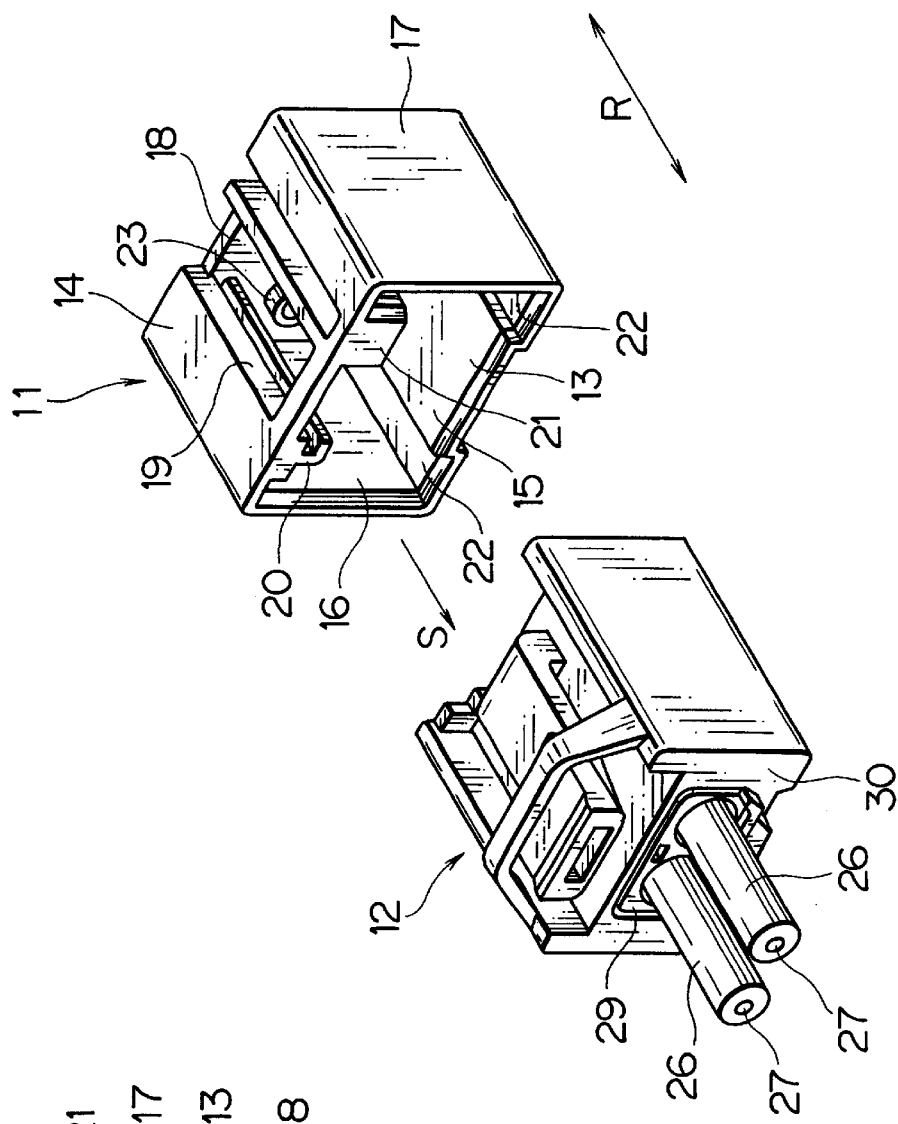
FIG. 1 is a perspective view showing an embodiment of a protection cap according to the present invention.
Figure 2:
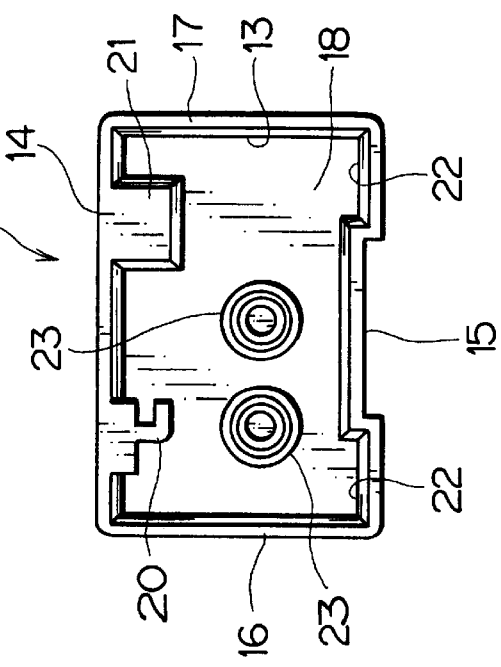
FIG. 2 is a front view of the protection cap of FIG. 2.

In FIG. 1, reference numeral 11 designates a protection cap for protecting an optical connector 12. The protection cap 11 is made of a synthetic resin material and can be removably attached to the optical connector 12 in an arrow R direction. The protection cap 11 is defined by molding dies which can be removed parallel to an arrow R direction.

Figure 3:
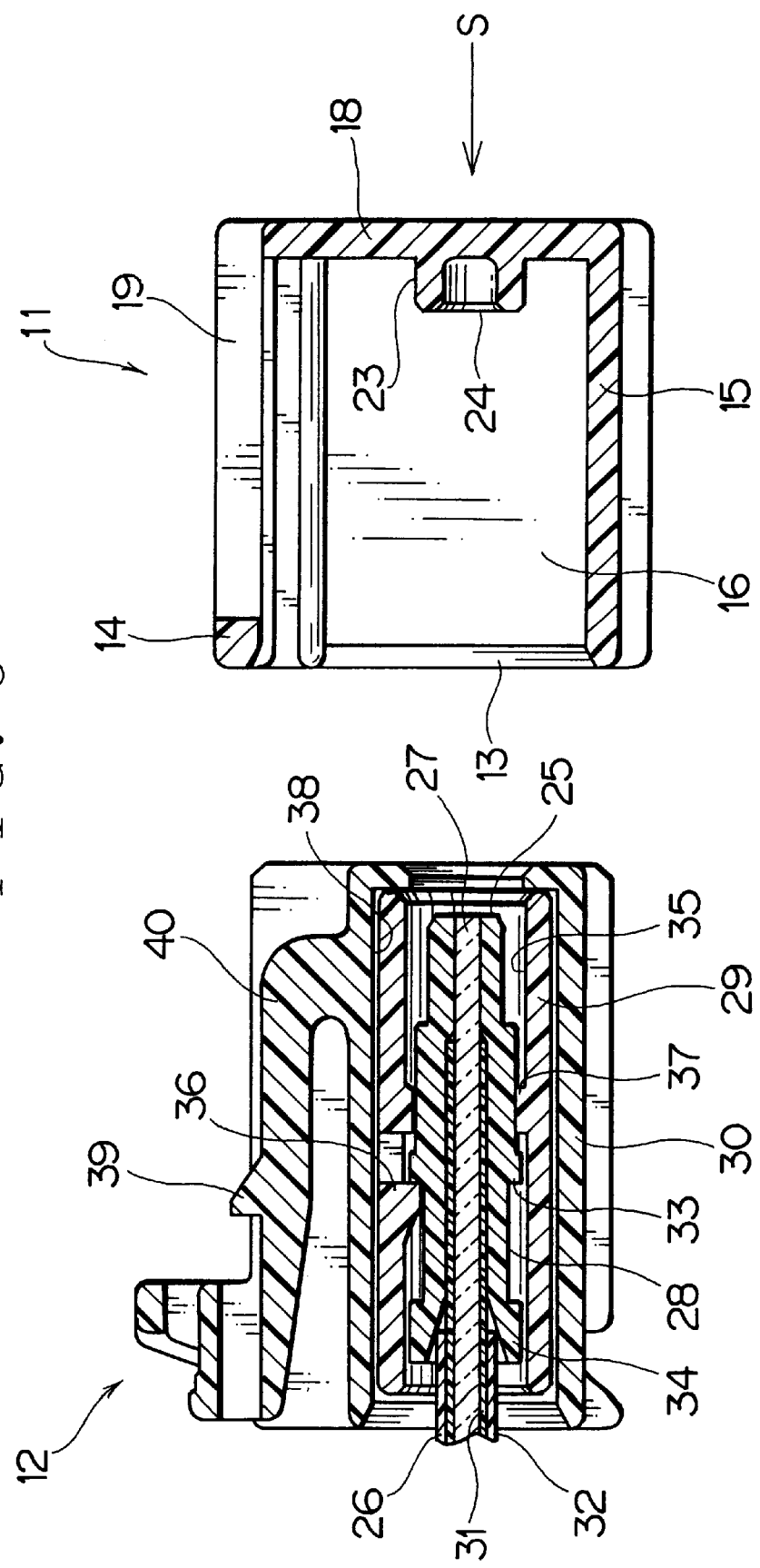
FIG. 3 is a sectional view showing the protection cap and an optical connector which are in a state before the engagement thereof.

In FIG. 1 or 3, the protection cap 11 has an entrance opening 13 and is defined in a rectangular box shape. The box-shaped protection cap 11 has an upper wall 14, a lower wall 15, a side wall 16, another side wall 17, and an inner wall 18. The inner wall 18 is contiguous with the other walls.

The upper wall 14 is formed with a locked portion 19 engaged with a lock protrusion 39 described later of the optical connector 12. The locked portion 19 is defined by cutting out the upper wall 14, which is partially contiguous with an edge of the inner wall 18. The locked portion 19 is elongated along the arrow R direction. The upper wall 14 has also ribs 20, 21 which are positioned on an inner surface of the upper wall 14. The upper wall 14 is defined to fit on an outer shape of the optical connector 12.

The lower wall 15 is formed with channels 22, 22 each extended in an inner surface thereof along the arrow R direction. The channels 22, 22 each are contiguous with the side wall 16 or 17. The channels 22, 22 are defined to fit on an outer shape of the optical connector 12. The side walls 16 and 17 of this embodiment are flat.

The inner wall 18 has the projections 23, 23 on an inner surface thereof. The projection 23 protrudes parallel to the arrow direction R and has a short cylindrical wall with a bottom. The projection 23 has an annular edge with a tapered surface 24 at a tip of the projection 23. The tapered surface 24 can contact a ferrule 28 of the optical connector.

Note that a projection height of the projection 23 is determined in conformity with an end face 25 of the ferrule 28. The projection 23 may be defined so as to receive a tip portion of the ferrule 28.

In FIG. 1 or 3, the optical connector 12 is constituted by the ferrules 28, 28 (one of them is illustrated), an adapter 29 receiving the ferrules 28, 28, and an adapter case 30 accommodating the adapter 29. The ferrule 28 has the end face 25 at which a core 27 of an optical fiber cable 26 is exposed.

The optical fiber cables 26, 26 (optical fiber cords) each are constituted by the core 27 (plastic optical fiber) having a clad, a primary sheath 31, and a secondary sheath 32. The optical fiber cable 26 has an stripped end inserted into the ferrule 28.

The ferrule 28 is defined in a cylindrical shape and has the end face 25 at which the core 27 is exposed. The ferrule 28 has an annular flange 33 and another annular flange 34 each of which is annually projected from an outer surface of the ferrule 28.

The adapter 29 has accommodation chambers 35, 35 (one of them is illustrated) for receiving the ferrules 28, 28. On the reception of the ferrules 28, 28, the flexible lock projections 36, 36 (one of them is illustrated) formed on the adapter 29 engage with the flanges 33, 33 to prevent disengagement of the ferrules 28, 28 from the accommodation chambers 35, 35. Reference numerals 37, 37 (one of them is illustrated) designate stoppers for the ferrules 28, 28. When the ferrules 28, 28 have been received in the accommodation chambers 35, 35, the flexible lock projections 36, 36 and the stoppers 37, 37 determine the positions of the ferrules 28, 28.

The adapter case 30 is a housing having an accommodation chamber 38 for accommodating the adapter 29. When the adapter 29 has been received in the accommodation chamber 38, the adapter 29 is locked by a holder (not shown). On an outer surface of the adapter case 30, there is provided the lock protrusion 39 engaged with the adapter 29 of the protection cap 11. The lock protrusion 39 is formed at a longitudinal middle of a resilient lock arm 40.

Figure 4:
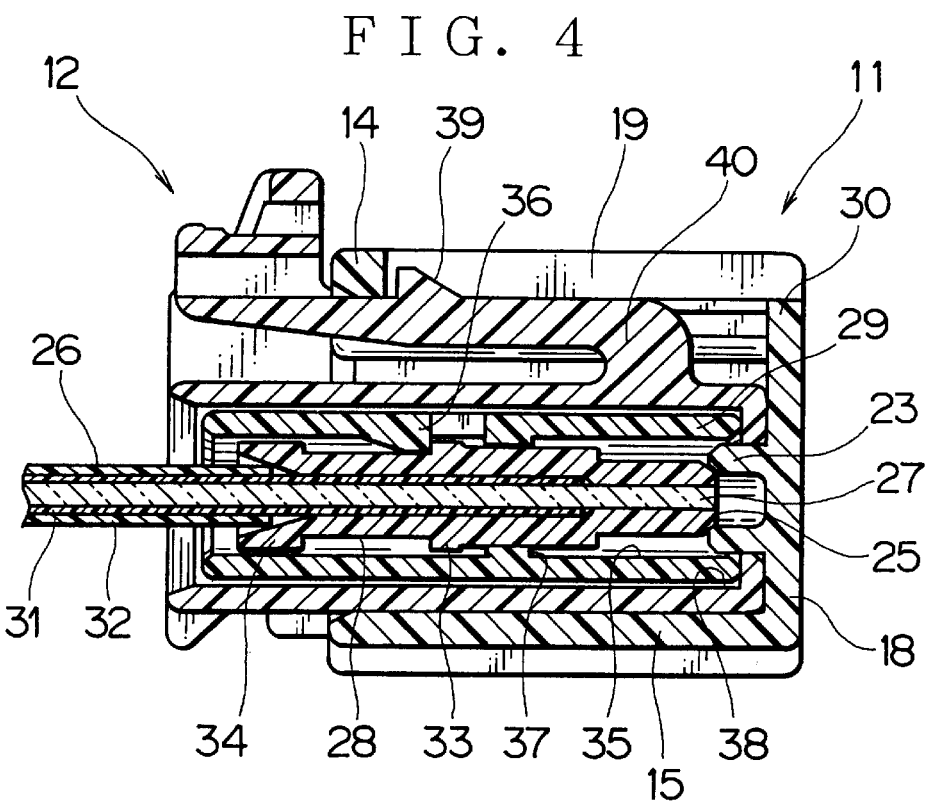
FIG. 4 is a sectional view showing the protection cap and the optical connector which are in an engaged state thereof.
Figure 5:
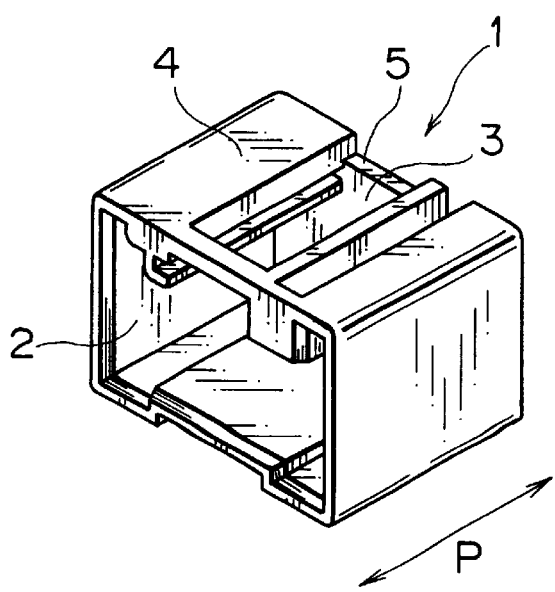
FIG. 5 is a perspective view showing a conventional protection cap.
Figure 6:
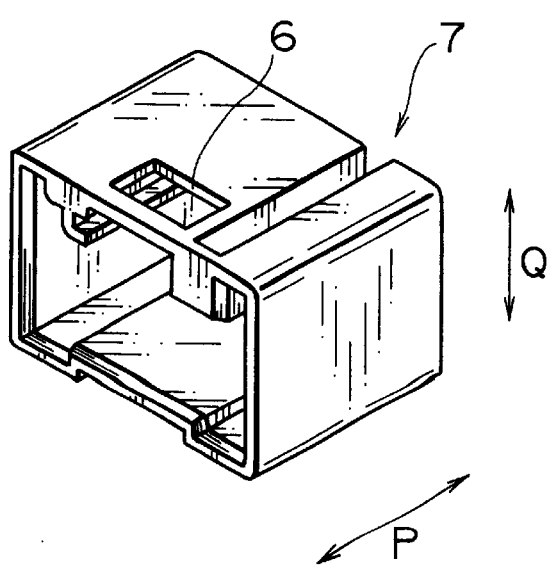
FIG. 6 is a perspective view showing another conventional protection cap.

As illustrated in FIG. 1 or 3, the protection cap 11 is positioned in front of the optical connector 12. Then, the protection cap 11 is moved along an arrow S to engage the protection cap 11 with the optical connector 12, so that the protection cap 11 receives the optical connector 12. Thereby, as illustrated in FIG. 4, the engagement of the lock protrusion 39 with the locked portion 19 completes the attachment of the protection cap 11 on the optical connector 12. In this state, the projections 23, 23 of the protection cap 11 protectively cover the end faces 25, 25 of the ferrules 28, 28. In addition, the tapered surfaces 24, 24 of the projections 23, 23 abut against end surfaces of the ferrules 28, 28, and the flexible lock projections 36, 36 prevent a returning movement of the ferrules 28, 28.

As discussed above of FIGS. 1 to 4, the protection cap 11 can be molded by the molding dies which can be removed parallel to the engagement direction (arrow R direction) of the protection cap 11 and the optical connector 12. Thus, the protection cap 11 can be produced by the simplified molding die, reducing a production cost of the protection cap 11. Moreover, since the protection cap 11 has the projections 23, 23 formed on the innerwall 18 thereof, the projections 23, 23 can surely protect the end faces 25, 25 of the ferrules 28, 28 from dust or the like, although the protection cap 11 has the locked portion 19 with a large opening. Note that the protection cap 11 is attached to the optical connector 12 to generally cover the optical connector 12 itself.

In the embodiment, the protection cap 11 for the optical connector 12 has been discussed. The present invention can be also applied to a hybrid connector integrally having an electrical connection portion and an optical connection portion.

What is claimed is:

1. A protection cap removably attached to an optical connector or a hybrid connector to protect the connector in a stare before use, the connector having an optical cable ferrule therein, the cable ferrule having an end face at which an optical cable core is exposed,
   wherein the protection cap has a locked portion engaged with, a lock portion of the optical connector or the hybrid connector and has an integrally formed projection therein on an inner wall of the protection cap for protectively covering the end face of the cable ferrule, the protection, cap being of a box shape which can be molded by one or more molding dies that can be removed in an engagement direction of the protection cap with the optical connector or the hybrid connector, the projection having a tip contacting with the end face of the ferrule when the protection cap has completely attached to the connector.

2. The protection cap set forth in claim 1, wherein the projection has an annular peripheral tapered edge at the tip of the projection, the tapered edge of the tip abutting against the end face of the ferrule when the protection cap has completely attached to the connector.

3. The protection cap set forth in claim 1, wherein the projection can be inserted into an accommodation chamber of the cable ferrule of the connector until a tip end surface of the connector abuts against the inner wall of the protection cap, when the protection cap receives the connector.

4. The protection cap set forth in claim 1, wherein the lock portion of the protection cap has an opening, and the lock portion of the connector has a resilient lock arm that engages with the opening when the protection cap attaches to the connector, the opening extended to a rear end of the projection cap such that the molding dies can be removed in the engagement direction of the protection cap with the connector.

* * * * *